United States Patent
Chari et al.

(10) Patent No.: US 10,812,254 B2
(45) Date of Patent: Oct. 20, 2020

(54) IDENTITY CONFIDENCE SCORE BASED ON BLOCKCHAIN BASED ATTRIBUTES

(71) Applicant: International Business Machines Corporation, Armonk, NY (US)

(72) Inventors: Suresh N. Chari, Scarsdale, NY (US); Ashish Kundu, Elmsford, NY (US); Sridhar Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 16/048,420

(22) Filed: Jul. 30, 2018

(65) Prior Publication Data

US 2020/0036515 A1   Jan. 30, 2020

(51) Int. Cl.
| | |
|---|---|
| H04L 9/06 | (2006.01) |
| H04L 9/32 | (2006.01) |
| G06F 21/60 | (2013.01) |
| G06N 20/00 | (2019.01) |

(52) U.S. Cl.
CPC .......... H04L 9/0637 (2013.01); G06F 21/602 (2013.01); G06N 20/00 (2019.01); H04L 9/32 (2013.01)

(58) Field of Classification Search
CPC .............................. H04L 9/0637; H04L 9/032
See application file for complete search history.

(56) References Cited

U.S. PATENT DOCUMENTS

| | | | | |
|---|---|---|---|---|
| 10,121,025 B1 * | 11/2018 | Rice | ............... | H04L 9/30 |
| 10,664,576 B2 * | 5/2020 | Edelman | ............... | G06F 21/316 |
| 2015/0332283 A1 | 11/2015 | Witchey | | |
| 2016/0063071 A1 * | 3/2016 | Guy | ............... | G06F 16/24578 |
| | | | | 707/725 |
| 2016/0275461 A1 * | 9/2016 | Sprague | ............... | H04L 63/126 |
| 2016/0379182 A1 * | 12/2016 | Sheng | ............... | G06Q 20/02 |
| | | | | 705/44 |
| 2018/0025140 A1 * | 1/2018 | Edelman | ............... | G06F 21/31 |
| | | | | 726/7 |
| 2019/0034780 A1 * | 1/2019 | Marin | ............... | G06F 16/951 |
| 2019/0080392 A1 * | 3/2019 | Youb | ............... | G06Q 40/00 |
| 2019/0213652 A1 * | 7/2019 | Sharma | ............... | G06Q 30/0609 |
| 2019/0230089 A1 * | 7/2019 | Xu | ............... | G06F 21/604 |
| 2019/0306549 A1 * | 10/2019 | Dietz | ............... | G06Q 30/0201 |
| 2019/0378048 A1 * | 12/2019 | Shrivastava | ............... | G06N 20/00 |

(Continued)

FOREIGN PATENT DOCUMENTS

WO    201782238    5/2017

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Ali Shayanfar

(74) *Attorney, Agent, or Firm* — Law Office of Jim Boice

(57) ABSTRACT

A processor-implemented method provides a calculated identity confidence score for an identity. The processor(s) in each of a plurality of decentralized identity providers calculate an identity confidence score of an entity. The processor(s) store the calculated identity confidence score in a blockchain. The processor(s) retrieve the calculated identity confidence score from the blockchain. The processor(s) provide the calculated identity confidence score to a requestor, which is a computer-based system that performs an action based on the provided calculated identity score.

15 Claims, 19 Drawing Sheets

(56) References Cited

U.S. PATENT DOCUMENTS

2019/0378142 A1\* 12/2019 Darnell ............ G06Q 20/40145
2019/0392924 A1\* 12/2019 Bettencourt-Silva ........................
                                                                                                G16H 70/40

\* cited by examiner

| 501 | 503 | 505 | 507 | 509 | 511 |
|---|---|---|---|---|---|
| ATTRIBUTES OF THE IDENTITY | RELATIONSHIP BETWEEN THE IDENTITIES AND ATTRIBUTES | USAGE-UPDATE-GRAPH FOR ID AND ATTRIBUTES | CONFIDENCE SCORE OF PROVIDERS, RELYING PARTIES AND PROOFING PARTIES | CONFIDENCE SCORE OF DE-CENTRALIZED WALLETS HOLDING ID ATTRIBUTES | WEIGHT OF EACH ACTOR |

FIG. 5

| | RELATIONSHIPS BETWEEN IDENTITIES AND ATTRIBUTES | ID ATTRIBUTES AVAILABLE FOR COMPUTATION OF CONFIDENCE SCORE | ID ATTRIBUTES ACCESSIBLE ONLY AT THE DISCRETION OF THE USER (STORED IN THE WALLET) |
|---|---|---|---|
| PRIVACY POLICY | •RELATIONSHIPS THAT ARE AVAILABLE FOR COMPUTATION OF CONFIDENCE SCORE | •ARE THE LATEST UPDATES AVAILABLE? •PROOFING POINTS | •COMPUTE AN OVERALL CONFIDENCE SCORE CS THAT INCLUDES SUCH ATTRIBUTES. |
| CONSENT POLICY (PURPOSE-DRIVEN CONFIDENCE SCORES) | IS THE RELATIONSHIP INFORMATION ACCESSIBLE FOR THE PURPOSE STATED? | | |
| TEMPORAL PROPERTIES OF THE IDENTITY | •WHEN WAS THE RELATIONSHIP UPDATED? •WHEN WAS THE LAST TIME RELATIONSHIPS ARE PROOFED? | •WHEN WERE THE ATTRIBUTES UPDATED? •WHEN WAS THE ATTRIBUTE PROOFED/USED LAST TIME? | |
| STATISTICAL MEASURES | | | •FREQUENCY OF UPDATES- THE MORE THE UPDATES ARE > THRESHOLD OR THE LESS THE UPDATES ARE < LOWER THRESHOLD, CONFIDENCE SCORE IS LOWERED. •FREQUENCY OF PROOFING •FREQUENCY OF USAGE •FREQUENCY OF ERRORS AND FAILURE AT PROOFING |
| USE OF THE IDENTITY BY CONSUMERS | | | CONSUMER C(I) WITH CONFIDENCE SCORE S(I) USED IDENTITY ID(J), K' TIMES OVER LAST T UNIT OF TIME. (RECURSIVE FORMULATION (SIMILAR TO PAGERANK)) |
| RATINGS FROM CONSUMERS | | | CONSUMERS CAN RATE THE IDENTITIES THEY USED AND IF SUCH IDENTITIES LED TO ANY FRAUDULENT TRANSACTIONS. THE HIGHER THE CONFIDENCE SCORE OF A CONSUMER (SUCH AS A BANK), THE HIGHER THE WEIGHTAGE OF SUCH RATINGS. APPLIES TO RELATIONSHIPS/DEPENDENCIES, ATTRIBUTES. |

IDENTITY CONFIDENCE SCORE BASED ON BLOCKCHAIN BASED ATTRIBUTES

BACKGROUND

The present invention relates to the field of blockchains, and particularly to blockchains that support the exchange of identity attributes. Still more particularly, the present invention relates to establishing a confidence score for an identity based on identity attributes that are managed by a blockchain.

SUMMARY

In one or more embodiments of the present invention, a processor-implemented method provides a calculated identity confidence score for an identity. The processor(s) in each of a plurality of decentralized identity providers calculate an identity confidence score of an entity. The processor(s) store the calculated identity confidence score in a blockchain. The processor(s) retrieve the calculated identity confidence score from the blockchain. The processor(s) provide the calculated identity confidence score to a requestor, which is a computer-based system that performs an action based on the provided calculated identity score.

In one or more embodiments, the presently described method invention is implemented in a computer system and/or as a computer program product.

BRIEF DESCRIPTION OF THE DRAWINGS

FIG. 5 is a table of various factors used in creating and grading an identity in accordance with one or more embodiments of the present invention;

FIG. 7 is a table of various features of an identity in accordance with one or more embodiments of the present invention;

DETAILED DESCRIPTION

Figure 1:
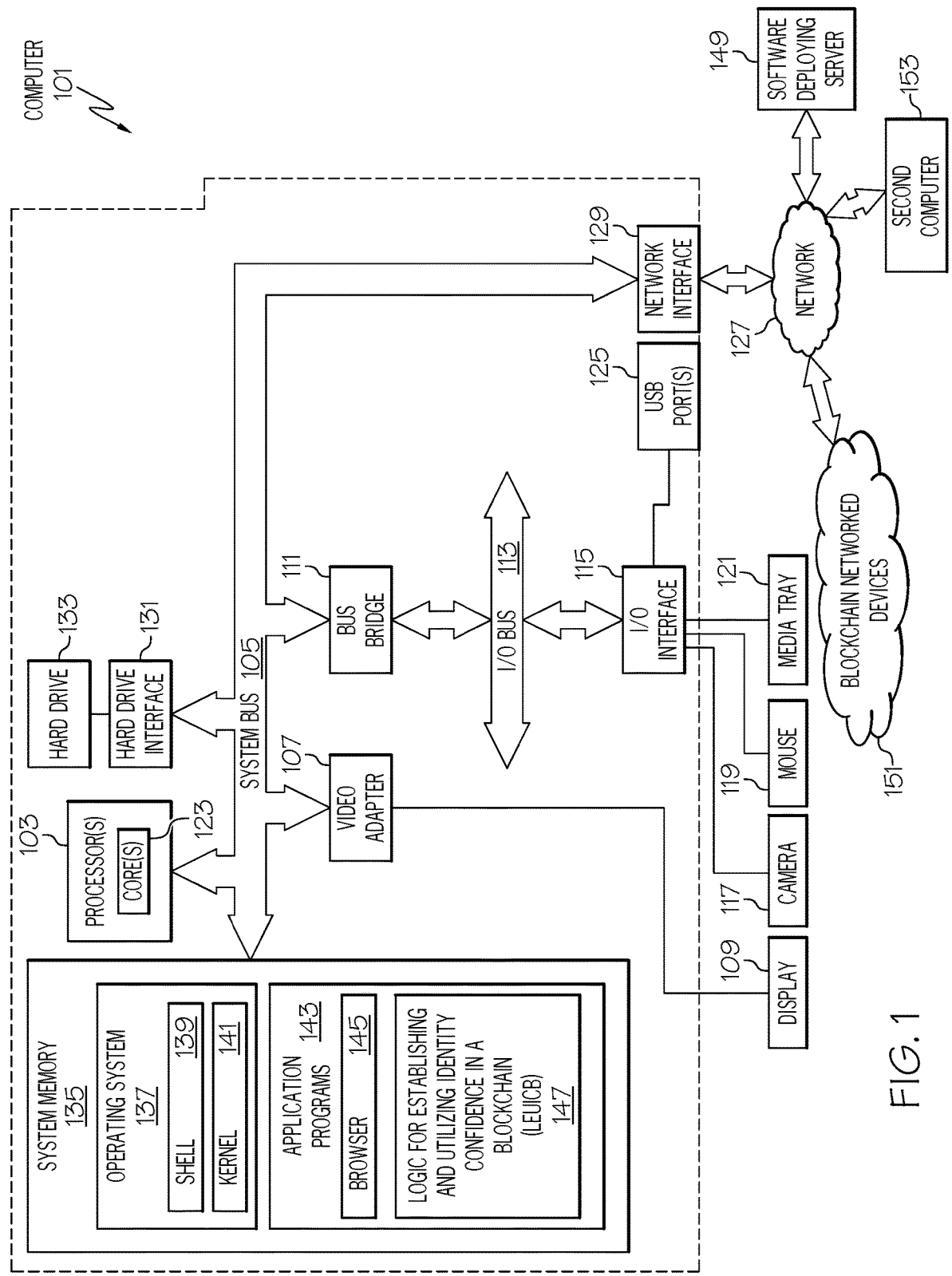
FIG. 1 depicts an exemplary system and network in which the present invention utilizes in various embodiments.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 and/or a blockchain networked devices 151 and/or second computer 153 shown in FIG. 1.

In one or more embodiments of the present invention, exemplary computer 101 includes a processor 103 that is coupled to a system bus 105. Processor 103 utilizes one or more processors, each of which has one or more processor core(s) 123. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including by not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Logic for Establishing and Utilizing Identity Confidence in a Blockchain (LEUICB) 147. LEUICB 147 includes code for implementing the processes described below, including those described in FIGS. 2-16. In one embodiment, computer 101 is able to download LEUICB 147 from software deploying server 149, including in an on-demand basis, wherein the code in LEUICB 147 is not downloaded until needed for execution. In one embodiment of the present invention, software deploying server 149 performs all of the functions associated with the present invention (including execution of LEUICB 147), thus freeing computer 101 from having to use its own internal computing resources to execute LEUICB 147.

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

End user fraud during new account creation is a problem faced by consumer applications in finance, healthcare, travel, and other industries. However, techniques known in the prior art (e.g., filling out extensive questionnaires whenever applying for a new loan) are so cumbersome that customers are often deterred from pursuing the loan or other service.

One or more embodiments of the present invention address this problem (of seamlessly verifying an entity's identity) by providing a method and/or system that balances user friction and reduces fraud. One or more embodiments of the present invention leverage identity information that has already been validated by other identity and attribute providers in order to derive an entity confidence score that describes how correct, valid, and/or authentic an identity is for a particular entity. In one or more embodiments of the present invention, this identity confidence score is used to not only mitigate user fraud, but also to provide the right level of validation when creating new accounts for users.

A digital asset (also referred to herein as an identity asset and a digital identity asset) is defined as digital information about a user and that identifies the user. Examples of a digital identity asset include, but are not limited to, financial information about the user, personal information about the user, consumer information about the user, etc. Digital identity assets describing users can be shared between parties in a digital identity ecosystem (e.g., identity providers and identity consumers), but only after the users (including the entity that is described by the digital identity asset) expressly provide their permission to do so.

Vendors such as banks and healthcare providers that use identities (of customers/users) need a new identity management and verification system that balances the tension between user friction and security.

That is, user friction (resistance to engaging with a service provider) occurs when users have to re-enter the same information at each Identity Provider (IdP) that collects user identity information. A user that expressly gives permission to share his/her user identity attributes enables the present invention to reuse identity information that has already been vetted by other identity providers, thus easing the user friction.

Security is paramount to identity providers. In the prior art, identity providers incurred costs associated with verifying attributes of user identities, since failure to verify such attributes often resulted in the identity providers incurring fraud from new users before they are verified. As such, one or more embodiments of the present invention enable identity providers to consult a service which provides a score reflecting confidence in the attributes and the associated values of a user identity.

Thus, one or more embodiments of the present invention provide a confidence scoring service that computers a score that quantifies the "identity provider's" confidence about the "correctness", "validity", and "authenticity" of the identity (and its attributes) of a given entity. While the entity is described in one or more embodiments of the present invention as a person (user), in other embodiments of the present invention the entity is a system, device, etc. That is, just as the embodiments presented herein detail how the identity of a person is verified, other embodiments verify that a particular system/device is what it claims to be.

For example, assume that a computer attempts to access a database by identifying itself according to 1) its name, 2) its media access control (MAC) address, and/or its internet protocol (IP) address. In this embodiment, the various processes described herein for validating the identity of a person are used to validate the identity of the computer (e.g., by retrieving a confidence score for the device from a blockchain). Once the confidence score is retrieved and a determination is made that it is higher than a predetermined level, then the database is confident that the computer is what it says it is (e.g., is owned by an authorized user), and access to the database is then permitted, leading to transmittal of data from within the database to the authorized user/computer.

A low confidence score represents that "trusting" the identity or the attribute is not recommended. That is, a low confidence score implies fraudulent identity/attributes/transactions, but an actual (separate) "fraud score" is computed with a separate set of information and techniques. In accordance with one or more embodiments of the present invention, an untrusted identifier does not automatically imply a "fraudulent identifier". However, a "trusted identifier" (having a confidence score that is above a predefined level) assures the user/system that the identifier is valid.

Thus, various embodiments of the present invention provide a method and system for computing scores from decentralized stores of identity profiles by aggregating information from multiple Systems of Records (SoRs), such as enterprises that collect and store identities and identity attributes.

In various embodiments, the present invention measures the trust of the entity identity by computing a confidence score for the identity of a user. This trust/confidence score is determined by: using identity attribute graphs to generate the confidence score for the identity of the user; assimilating confidence scores from various parties that use (e.g., when deciding whether a user is who he/she says she is, in order to allow the user to access a service of the actor), updates (i.e., modifies according to additionally retrieved attributes about the user), or commits (i.e., saves to a local storage device) the different confidence scores; using recursive models for confidence scores in order to improve their accuracy; and/or using consensus for confidence scores in order to "grade" the confidence scores.

Thus, one or more embodiments of the present invention provide a system for computing the confidence score that is a de-centralized, privacy-preserving, blockchain-based, and/or based.

Figure 2:
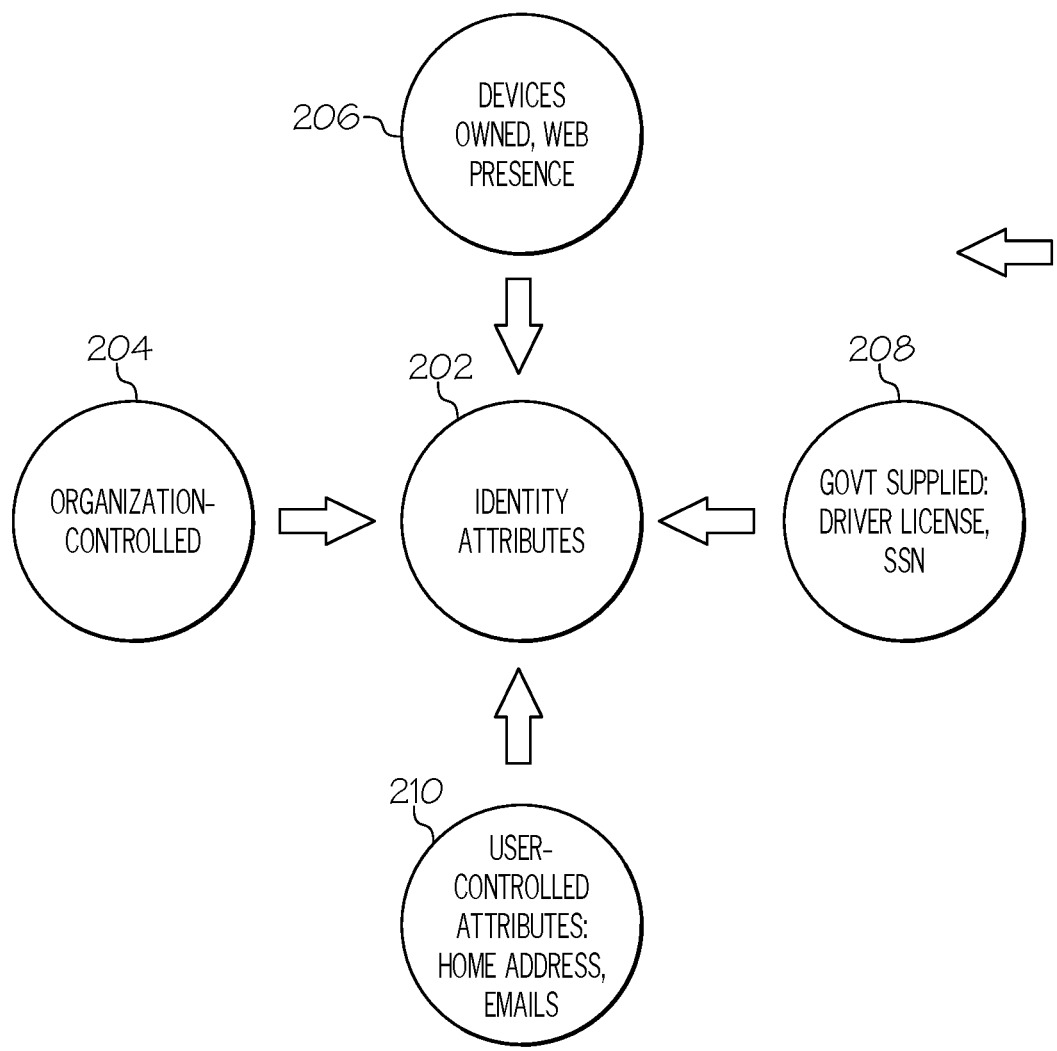
FIG. 2 illustrates exemplary use generation of identity attributes in accordance with one or more embodiments of the present invention.

With reference now to FIG. 2, various identity attributes 202 of an identity of an entity are presented. A shown in FIG. 2 and in accordance with various embodiments of the present invention, identity attributes 202 come from organization-controlled sources 204 (e.g., an enterprise's personnel file database); devices owned by and/or a web presence 206 of the entity (e.g., a particular entity is identified by a particular computer that he/she uses, which website he/she is currently viewing, etc.); government supplied data 208 (e.g., a driver's license number, a social security number, etc.); and/or a user-controlled data 210 (e.g., a home address of the entity/user, an email history for the entity/user, etc.).

That is and in one or more embodiments of the present invention, the organization-controlled sources 204 include data that is supplied by an employer, an entity verification service, etc., and provide identification information about a particular entity/person.

Devices owned by and/or a web presence 206 of the entity describe possessions of the entity/person (e.g., that he/she uses). Devices owned by and/or a web presence 206 of the entity also describe actions of the entity/person (e.g., the browsing history of the entity/person, an identity of a particular webpage that the entity/person is currently viewing, etc.), and thus provide identification information about a particular entity/person.

Government supplied data 208 are identifier attributes that are issued to a particular entity/person, such as a driver's license number, a social security number, etc., that provide identification information about a particular entity/person.

User-controlled data 210 is information that the user directly controls, such as where he/she lives, his/her email address, etc., that provides identification information about a particular entity/person.

Figure 3:
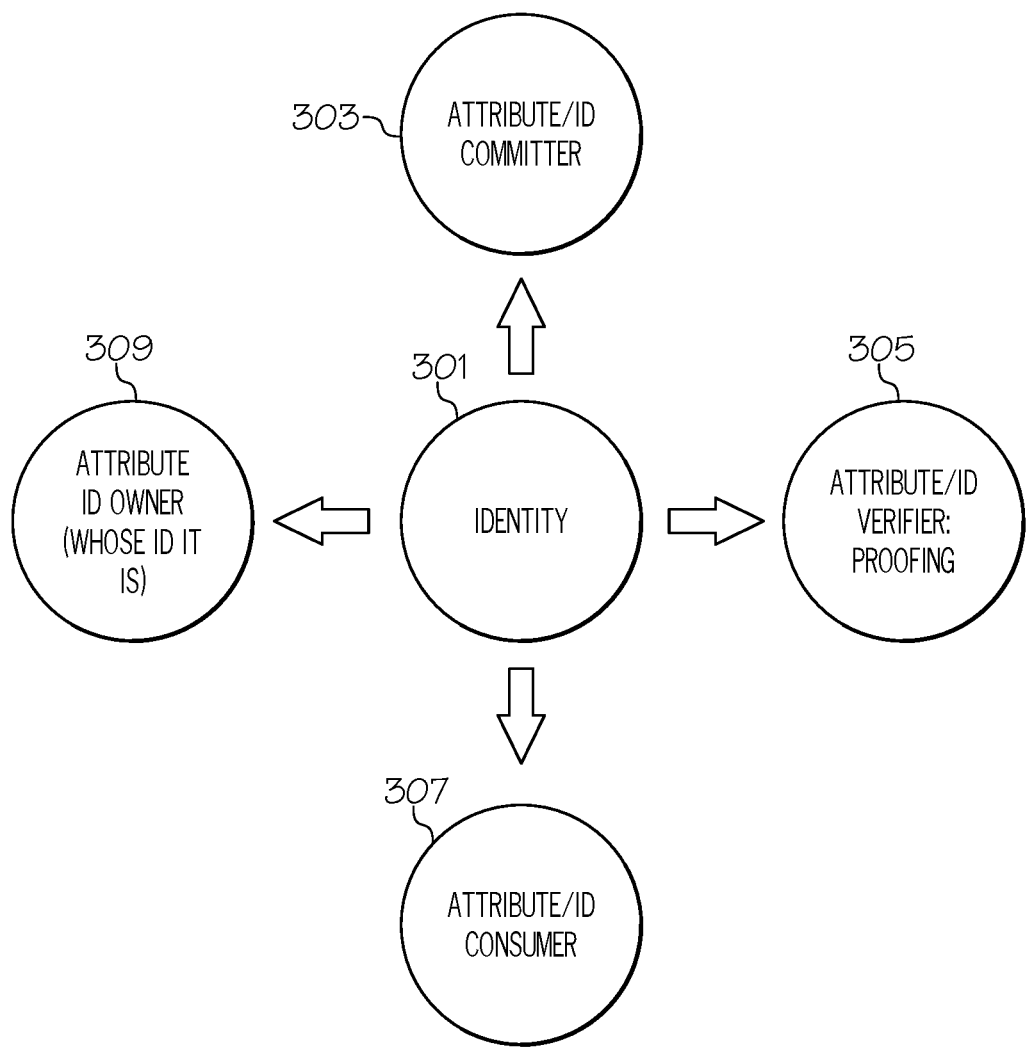
FIG. 3 depicts an exemplary consumption of an identity in accordance with one or more embodiments of the present invention.

As shown in FIG. 3, various actors own or use the identity 301 of a particular entity/person. For example, an attribute/identifier committer 303 is an entity that commits (e.g., stores/commits to a blockchain) the identity's attributes and/or identifier. A proofing service 305 is an entity that verifies ("proofs") the identity of a particular person/entity, and thus uses information in the identity 301 (as derived by the elements shown in FIG. 2) when verifying/proofing the identity of a particular person/entity. Attribute/identity consumer 307 is a bank or other enterprise that is interested in verifying the identity of a particular existing or prospective customer. In one embodiment of the present invention, attribute identity owner 309 is the entity that is described by the identify 301. In another embodiment of the present invention, attribute identity owner 309 is an Internet of Things (IoT) device that is identified by identity 301.

Figure 4:
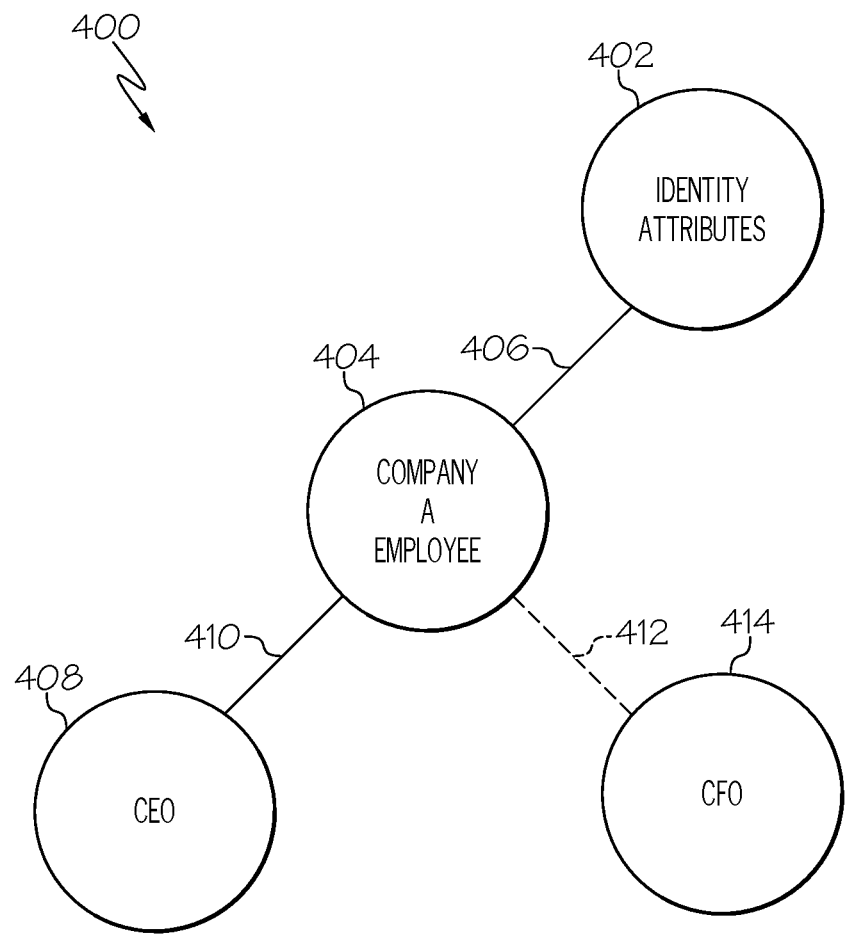
FIG. 4 illustrates an exemplary hierarchical graph of an identity in accordance with one or more embodiments of the present invention.

With reference now to FIG. 4, an embodiment of the present invention uses a graph 400 to represent attributes of an entity. That is, the identity of the entity/person is represented by graph 400 according to one or more identity attributes 402. The vertex (node) that represents the identity attributes 402 includes edges that indicate that the identity attributes 402 contain, are related to, inherent, etc. the features of other nodes.

For example, node 404 indicates (as suggested by edge 406) that the person is an employee of Company A. Furthermore, node 408 indicates (as suggested by edge 410) that the person is the chief executive officer of Company A. Since edge 412 is dashed (or even missing), then the entity is not also the chief financial officer (node 414) of Company A. As such, the graph 400 includes a list of attributes (node 402, as defined by nodes 404 and 408) that are hierarchically organized.

With reference now to FIG. 5, information used for computing a confidence score (for how trustworthy/reliable an identity for an entity is) is presented. Such information includes the attributes of the entity (block 501), the relationship between the identities and their attributes (block 503), a user-update-graph for identities and attributes (block 505), all of which are described in FIGS. 2-4.

As described in block 507, a confidence score of attribute/identity providers, relying parties, and proofing parties (see FIG. 3) is established. That is, just as a confidence score for the identity itself is established, confidence scores of attribute/identity providers, relying parties, and proofing parties are also established. For example, assume that an attribute/identity provider is an enterprise (e.g., a governmental agency such as a driver's license issuing agency) that has a long history of issuing identification cards and has an excellent history of protecting its database of identification cards from being hacked. The confidence score of this agency is given a high rating/weighting. However, if the attribute/identity provider is a private enterprise that makes identification cards "while you wait" with no requirement that the customer provide a birth certificate or other legitimate proof of identity, then the confidence score of this enterprise is given a low rating/weighting.

As described in block 509, a confidence score of de-centralized wallets holding identity attributes (i.e., a blockchain—as described in FIGS. 10-12) is generated based on how secure the blockchain is. That is, if there are only two peers in the blockchain, then it is not very secure, and the confidence score for information contained in that blockchain is very low. However, if there are hundreds or even thousands of peers in the blockchain, then it is highly very secure, and the confidence score for information contained in that blockchain is very high.

As described in block 511, a weight of each actor (see FIG. 3) is also assigned, according to how much value each actor is given in the identity management service. For example, assume that the proposed identity of the entity is sent to a proofing entity (block 305 in FIG. 3) and a bank (block 307 in FIG. 3). Assume further that the fact that a trusted proofing entity is determined by predefined parameters to be a more significant entity than the consumer (the bank) of the identity. As such, the confidence score of the proofing entity is weighted higher than the confidence score of the consumer/bank.

Figure 6:
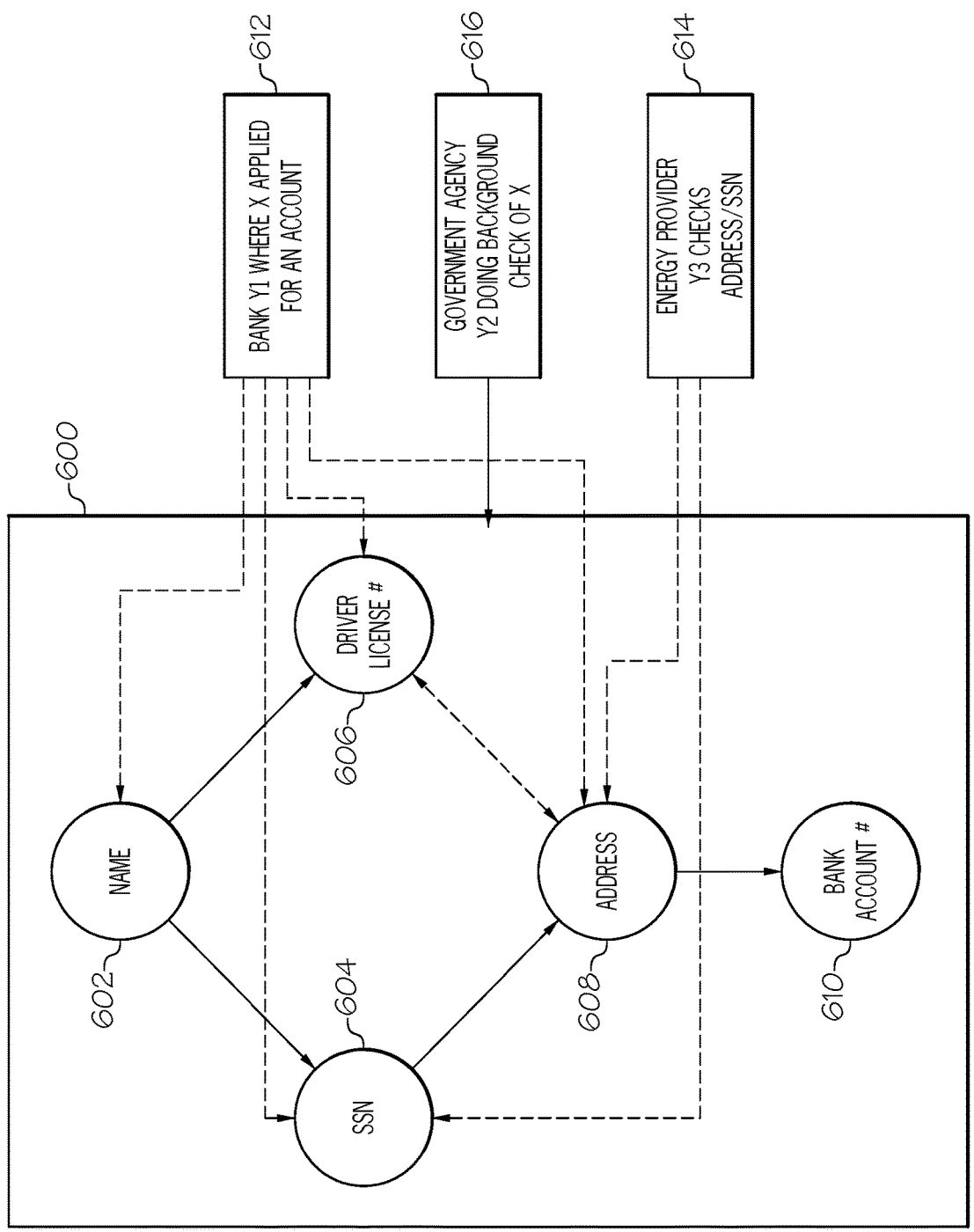
FIG. 6 depicts an exemplary use case of an identity being generated and consumed in accordance with one or more embodiments of the present invention.

With reference now to FIG. 6, assume that an identity 600 of an entity/person "X" has multiple attributes, including the person's name 602, that person's social security number 604, that person's driver's license number 606, that person's home/work address 608, that person's bank account number 610. As shown in FIG. 6, that person's name 602, social security number 604, driver's license number 606, and home/work address 608 are consumed by a Bank Y1 where that person "X" has applied for an account, which is granted under the bank account number shown in element 610. Similarly, an energy provider Y3 (e.g., a municipal electric company) consumes the address 608 and social security number 604 of what a prospective customer has provided, in order to confirm that person's identity 600. Similarly, a governmental agency Y2 doing a background check of X (e.g., for a security clearance) by consuming that person's name 602, social security number 604, driver's license number 606, home/work address 608, and bank account number 610.

In an embodiment of the present invention, each time an entity (e.g., an entity such as Bank Y1, Government agency Y2, Energy provider Y3) consumes attribute data for identity 600, it requests a confidence score for the combined identity 600.

In an embodiment of the present invention, each time an entity (e.g., an entity such as Bank Y1, Government agency Y2, Energy provider Y3) consumes attribute data for identity 600, it sends a trust score that identifies the level of trust that it has in the accuracy/authenticity of the identity 600. That is, each consuming entity (e.g., an entity such as Bank Y1, Government agency Y2, Energy provider Y3) is aware of the confidence score of the identity 600 and its individual attributes (602-610), and returns (e.g., to computer 101 shown in FIG. 1) the level of agreement it has with the value of this confidence score. Thus, if Bank Y1 concludes (based on the reputations of actors that used the identity 600 as well as actors that supplied the attributes for identity 600) that the confidence score is too high, then the trust level (for Bank Y1) for the confidence level of attributes in identity 600 will be low, and vice versa.

With reference now to FIG. 7, a table 701 of metrics used for computing confidence scores for identifiers/identities is presented. As shown in table 701, such metrics include privacy policies of attribute providers and/or consumers (including relationships of such entities, currency of the scores, protection (e.g., in a blockchain), etc.

The metrics also consider a consent policy, such that the identity and role of the attribute providers and/or consumers is available for inspection.

The metrics also consider the temporal properties of the identity, including how recently relationships between attribute providers and/or consumers have been updated, how recently the attributes themselves were updated and/or used, etc.

The metrics also consider statistical measures of the frequency of the updates, proofing, usage, errors, etc.

The metrics also consider what entities are using the identity. That is, if a certain consumer (e.g., a bank) used the same identity multiple times within the past week, then the identity is deemed to be more trustworthy than if the identity was only used once during the past year.

The metrics also consider ratings from entities that consume the identity. For example, if a bank trusted a particular identity and it turned out to be fraudulent, then the confidence score for that particular identity would be very low (if not zero).

Figure 8:
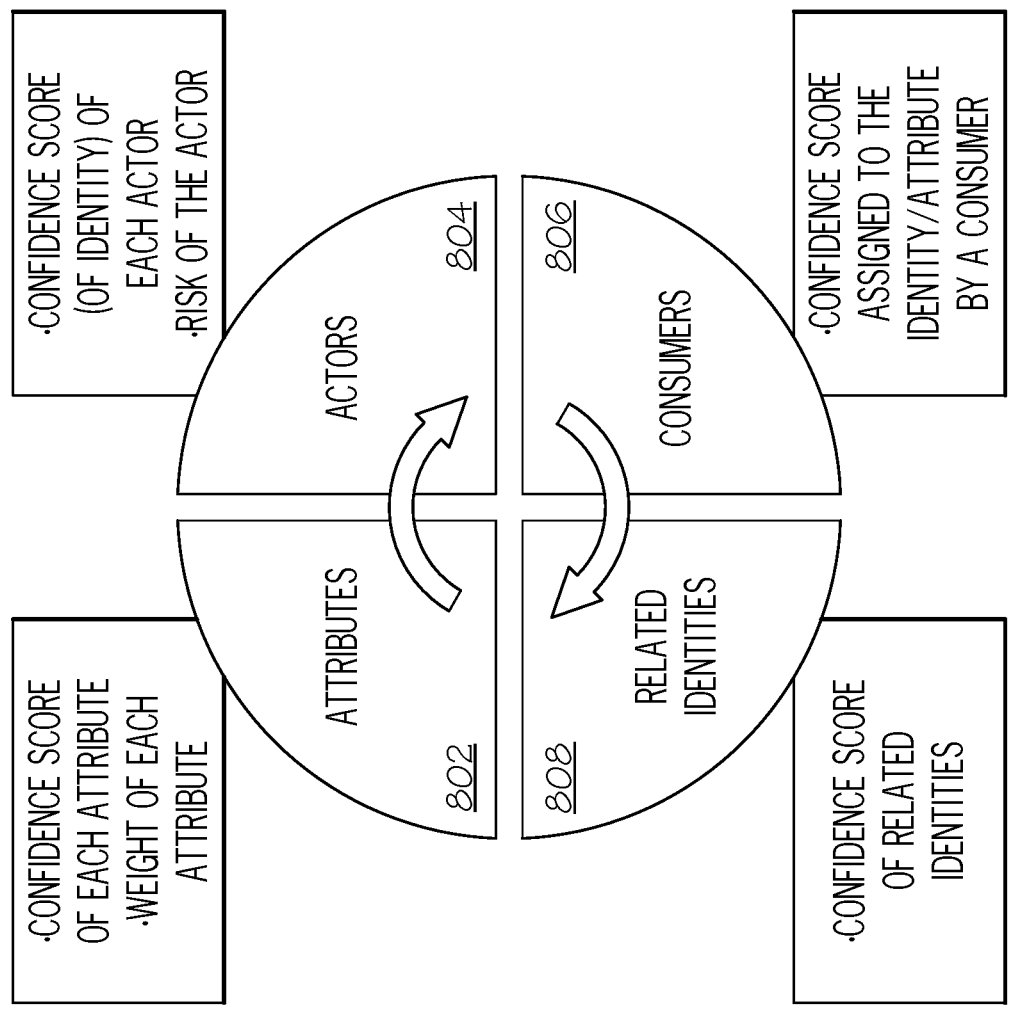
FIG. 8 illustrates relationships between attributes, actors, consumers, and related identities in accordance with one or more embodiments of the present invention.

With reference now to FIG. 8, various dimensions of the identities are described. That is, the attributes 802 of the identify (including a confidence score of each attribute and a weight of each attribute) is provided by actors 804, each of which has its own confidence score (i.e., that describes how trusted the actors 804 for providing identity attributes).

Furthermore, the consumers 806 assign confidence scores to the identity/attribute (i.e., based on how accurate the confidence score of the identity/attribute turned out to be), and conveys these confidence scores to other related identities 808. For example, if a consumer assigns a high confidence score to an identity/attribute for entity A, and entity B is related to entity A (e.g., entity B is a business partner of entity A), then this will affect the confidence score of the identity of entity B, since entity B is related to entity A.

In one or more embodiments, the present invention uses two processes to compute the confidence values for the identity: 1) Heuristic (non-learning), and 2) learning-based.

1) Heuristic (Non-Learning) Technique

The heuristic (non-learning) technique computes confidence scores of identities from available attributes and data. The confidence rank (i.e., score) of the identity is dependent on the confidence rank of each of the available attributes. The confidence rank of each attribute is in turn dependent on the rank of the confidence rank of the providers and the proofing agents. In one or more embodiments of the present invention, each of the confidence ranks has a certain weightage associated with it.

In an embodiment of the present invention, an attribute is dependent on other attributes. In the following example, a weighted average is replaced with other statistical functions. In another embodiment, method develops a recursive formulation of the weighted average.

In one or more embodiments of the present invention, the identity is a list of (attribute, value) pairs, where the attribute describes a component of the identity, and the value describes the confidence score of that component.

In one or more embodiments of the present invention, the confidence value of the identity is established by the formulas:

> Confidence of ID $C(\text{id})$=Weighted Average of $W(i)$
> *$\text{Conf}(A(\text{id},i))$, $n$=number of attributes
>
> $\text{Conf}(A(\text{id},i))$=Weighted average of the confidence rank of the provider/signer and the proofing agents In these two formulas, C is the confidence value of an identity (id); W is a weight that is defined by the system and/or the user for the confidence score of each attribute in the identity; and i is the current iteration of the n attributes. Thus, $\text{Conf}(A(\text{id},i))$ is the confidence in each or the providers and/or proofing agents of the attributes in the identity, and C(id) is the overall confidence score for the entire identity based on the weighted values of each confidence rank in Conf(A(id,i))

As depicted in FIG. 4, in one or more embodiments of the present invention, the identity is represented as a hierarchical graph, where each attribute represents a vertex (or node) and the arrows (or edges) show dependent relationships between the attributes. In an embodiment of the present invention, a recursive formulation updates the identities, attributes, and graphs based on newly-acquired data attributes.

This recursive scoring is based on a confidence score of the attributes. For example, > Confscore of identity attrib(i)=$f$(confscore of $j$ such that there is an edge from $j$ to $i$ in the identity graph, confscore of $m$, and trustscore provided by $m$ for $i$, where there is an edge from $m$ to $i$ in usage-update graph).

2) Learning Based Techniques

In learning based techniques, the confidence scores are based on supervised learning, such as that provided by a multi-class support vector machines (SVMs), which are supervised learning models that have learning algorithms that analyze data used for classification and regression analysis. That is, for a given a set of training examples that are marked as belonging to one of two categories, the SVM training algorithm builds a model that assigns new examples to one category or the other from the two categories, thus creating a binary learning system. In another embodiment, deep-learning (e.g., neural network learning that emulates biological neural pathways by "strengthening" connections between two nodes as they are repeatedly connected) is used to create/update confidence scores.

In one or more embodiments of the present invention, confidence scores (identity confidence scores) are verified by the consumers via email, phone, etc., in which identity providers vouch for attributes and their values. Thus, as an attribute is verified by more and more identity providers, the confidence score for that attribute rises.

In one or more embodiments of the present invention, a user supplies arbitrary attributes for attributes, which are then verified by one or more uses via a text message, a click-back link on an email message, etc. That is, rather than having attribute providers provide attributes for an identity, the attributes for that identity are arbitrarily (randomly) generated. Thereafter, attributes that are not verified by consumers (by their feedback) receive low confidence scores, while attributes that are verified are consumers receive high confidence scores.

In an embodiment of the present invention, the trustworthiness of attribute/identity verification consumers is rated according to how long they have been in existence. That is, if an attribute/identity verifier has only been in existence for a few days, then that attribute/identity verifier is given little trust as compared to another attribute/identity verifier that has been in existence for 10 years.

In an embodiment of the present invention, multiple "proofed" official identity documents (e.g., a driver's license, a birth certificate, etc.) are presented to a consumer. The more "proofed" official identity documents that are presented, the higher the confidence score.

In one or more embodiments of the present invention, a greater quantity of attributes (especially "proofed" attributes) results in a higher confidence score for an identity.

In one or more embodiments of the present invention, behavior based and/or relationship based features impact the confidence score of the identity. For example, if an attribute is ("goes to the bank every Monday"—behavior based) and another attribute is ("has other accounts with the bank"—relationship based), then such attributes strongly cause the confidence score of the identity to rise. Alternatively, if an attribute for the identity is "has never been in this location before" or "has never purchased this type of product before" or "phone number is one digit away from that used in a fraudulent transaction" (indicating the disposable phones that were bought together), then the confidence score of the identity is lowered.

Figure 9:
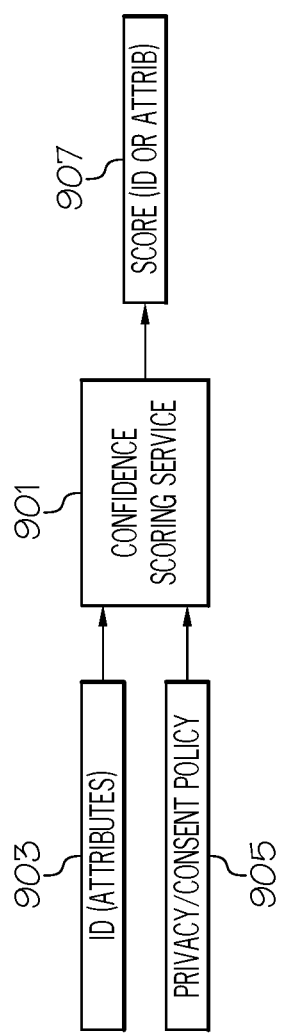
FIG. 9 depicts a high-level overview of one or more embodiments of the present invention.

With reference now to FIG. 9, in one or more embodiments of the present invention a centralized system is used to compute confidence scores. That is, a centralized confidence scoring service 901 receives identities/attributes 903, along with a privacy/consent policy 905 (which sets privacy parameters that must be followed when generating a confidence score). Utilizing the methodology described herein, a confidence score 907, for the identity and/or its attributes, is generated.

Figure 10:
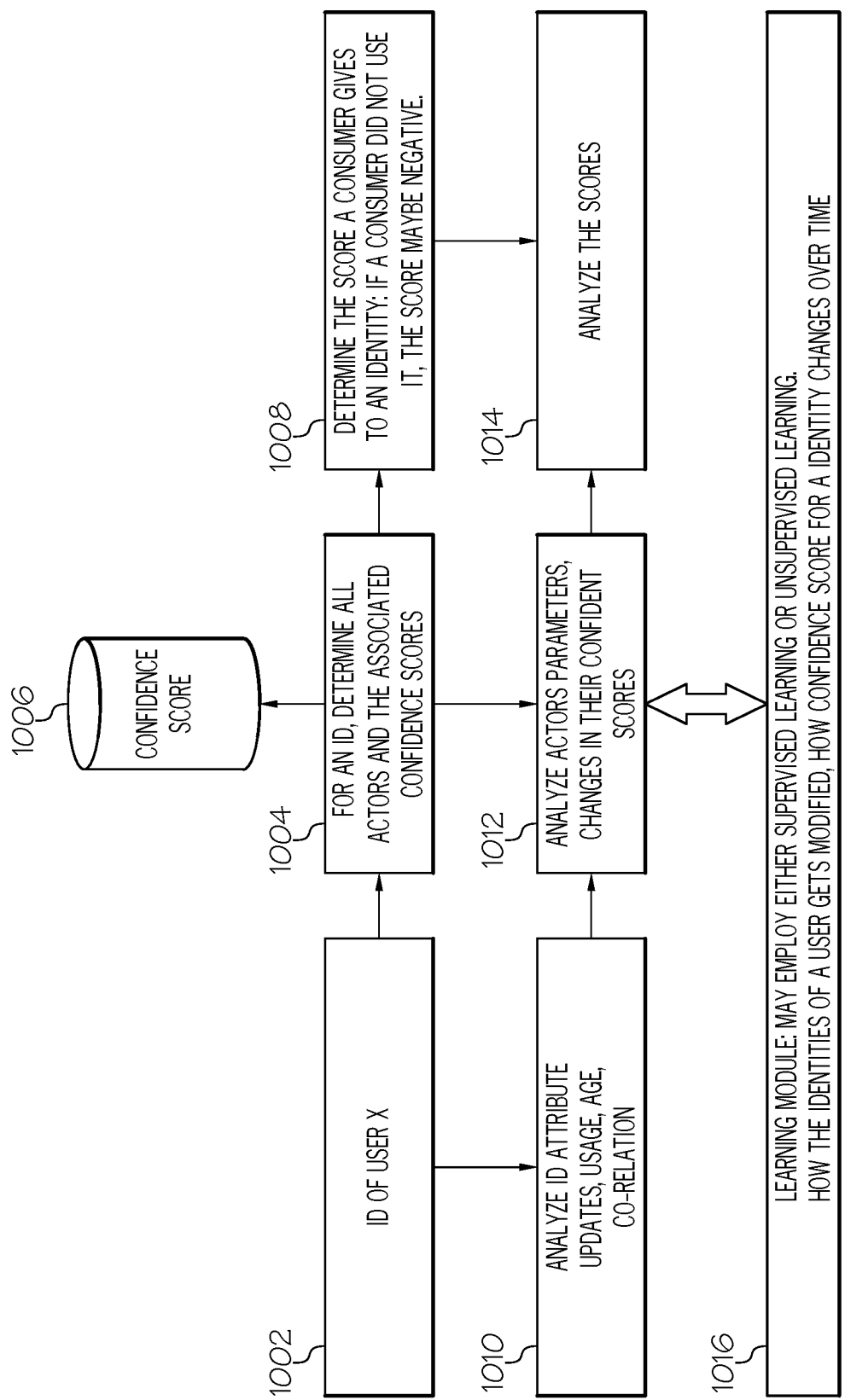
FIG. 10 illustrates an embodiment of the present invention in which a centralized system is utilized.

Thus, an exemplary centralized system process for computing confidence scores is presented in FIG. 10.

As shown in block 1002, a proposed identity (along with its attributes) for User X is sent to a centralized system, in which all actors and the associated confidence scores are determined (block 1004). These confidence scores are sent to a confidence score database 1006.

As shown in block 1008, a consumer (i.e., a party who uses the identity, such as a bank that is considering making a loan to a party with that identity) generates a score as to how accurate the identity turned out to be.

As shown in block 1010, any attribute updates, usage, age, and co-relation of the identity to other identities is analyzed. As shown in block 1012, the parameters of actors (i.e., consumers of the identity, updaters of the identity attributes, etc.) are analyzed, and the confidence score is adjusted accordingly. That is, if an actor updates an identity (e.g., confirming an attribute of the identity), then the confidence score is raised. The outputs of block 1010/1012 are then analyzed, as shown in block 1014.

As shown in block 1016, some or all of blocks 1002-1014 can have their activities updated by the learning module described herein, and how confidence scores change over time.

Figure 11:
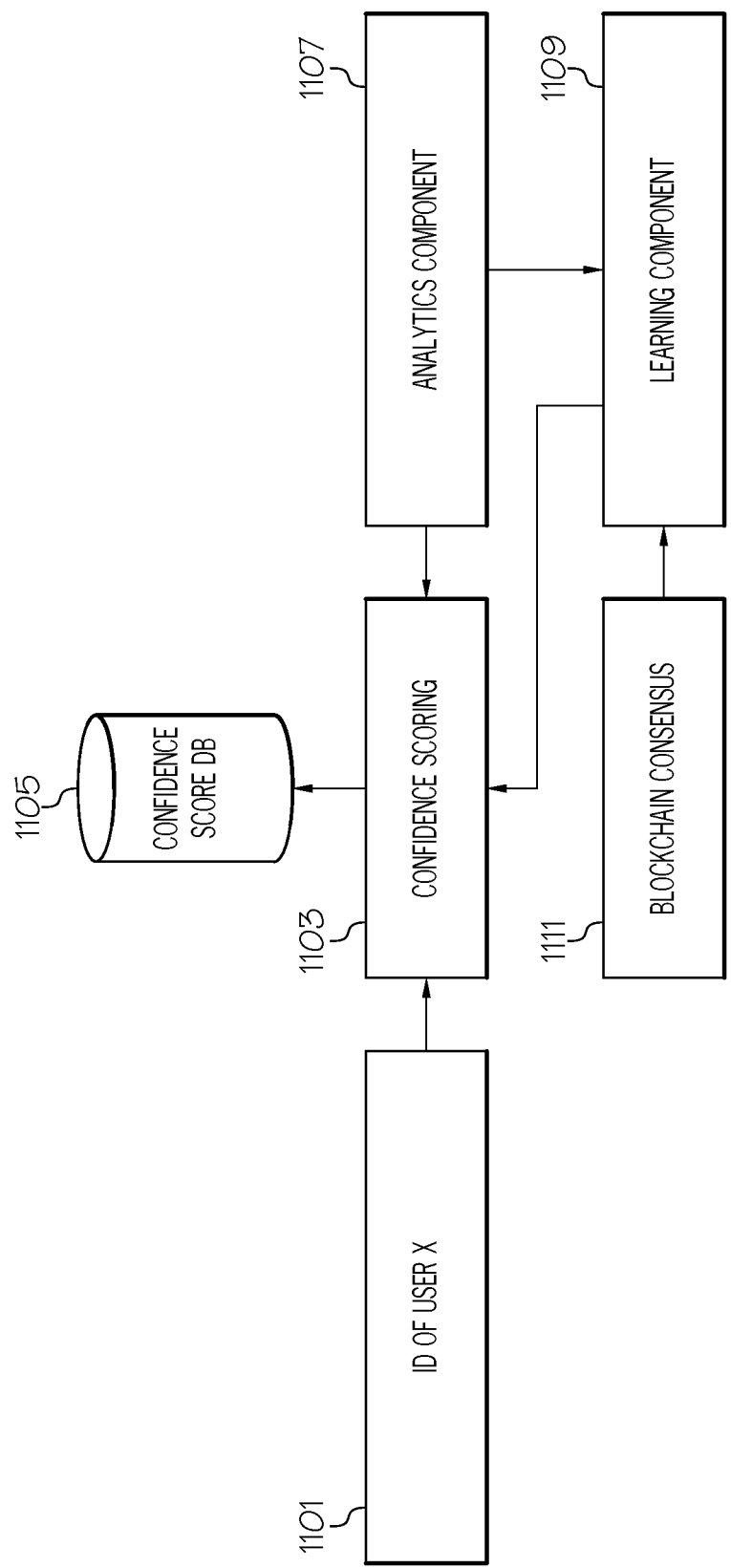
FIG. 11 depicts an embodiment of the present invention in which a decentralized system is utilized.

In one or more embodiments of the present invention, a blockchain is used to develop an identity, as described in FIG. 11.

As shown in block 1101, an identity (made up of multiple attributes) of User X is sent to logic, that performs confidence scoring for the individual attributes and the overall identity (block 1103). As depicted by block 1107, an analytics component 1107 (e.g., part of LEUICB 147 depicted in FIG. 1) is used in creating these confidence scores. The confidence scores are then stored in a confidence score database (block 1105), from which they can be retrieved for updating, use with other identities, etc.

With regard to updating the confidence scores, a learning component 1109 (non-heuristic—described above) updates the confidence scores and sends the updated confidence scores to the confidence scoring logic (block 1103).

As depicted in block 1111, a blockchain is used as a consensus evaluator of the identity. That is, a blockchain is used to confirm different transactions associated with the identity. In one embodiment of the present invention, these transactions are actual monetary transactions, while in another (preferred embodiment) they are confidence score generations/updates. Each peer in the blockchain will "race"

to evaluate/confirm an attribute/identity, thereby providing a level of security not provided by the prior art. That is, rather than poll various entities asking them for attributes, an attribute is introduced to a blockchain as a secure transaction. Thereafter, peers in the blockchain will evaluate the attribute in order to generate the confidence value of that attribute.

Figure 12:
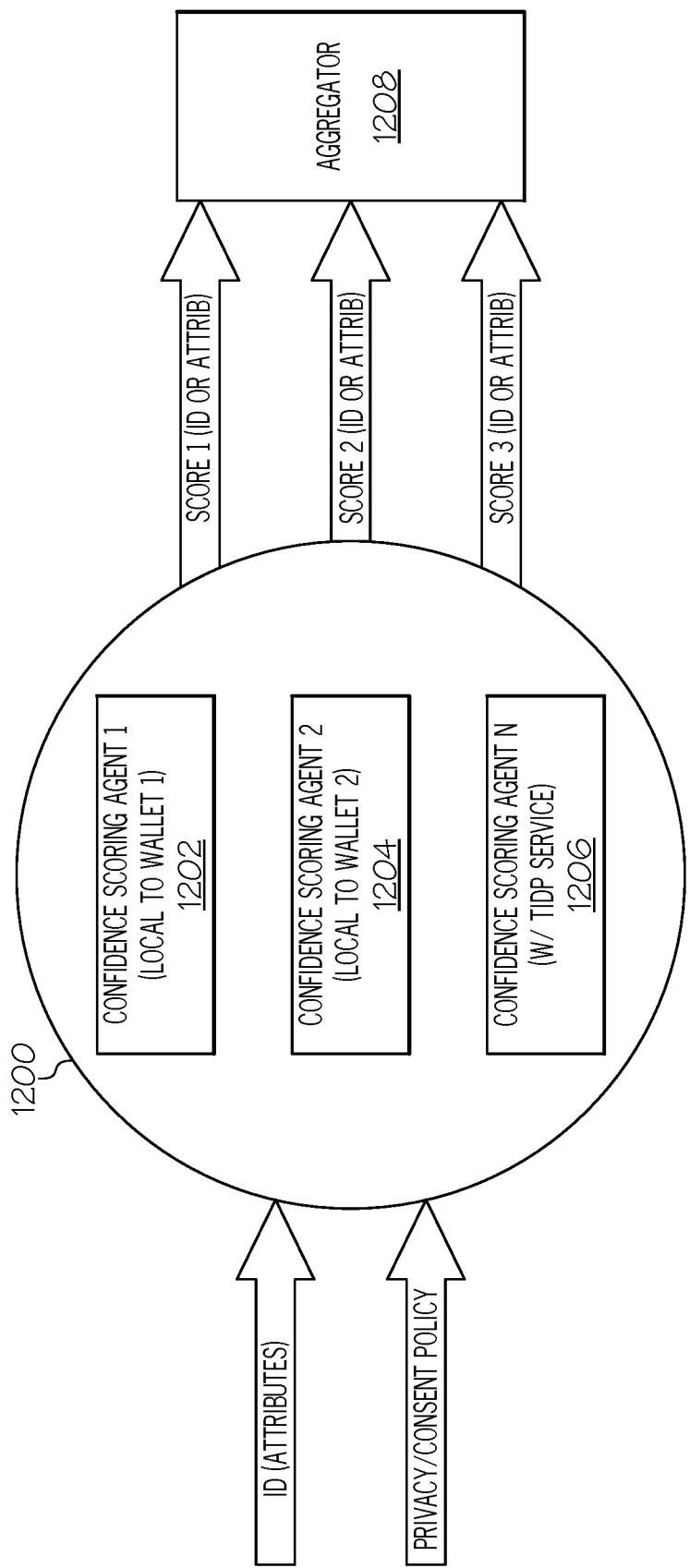
FIG. 12 illustrates a high-level overview of a decentralized system (e.g., a blockchain) generates confidence scores for an identity in accordance with one or more embodiments of the present invention.

Thus, in one or more embodiments and as described in FIG. 12, a blockchain 1200 includes a confidence scoring Agent 1 (1202), a confidence scoring Agent 2 (1204), and a confidence scoring Agent n (1206), where "n" is an integer that suggests that many agents are part of the blockchain 1200. Each of the agents (1202, 1204, 1206) are peers in the blockchain 1200. Each of the agents (1202, 1204, 1206) in the blockchain 1200 receive attributes/identities and a privacy/consent policy for the identities/attributes. Each of the agents (1202, 1204, 1206) in the blockchain 1200 generate a unique confidence score for the identity/attribute (shown as Scores 1, 2, 3), which are sent to an aggregator 1208, which creates an overall (e.g., average) confidence score for the identities/attributes.

Figure 13:
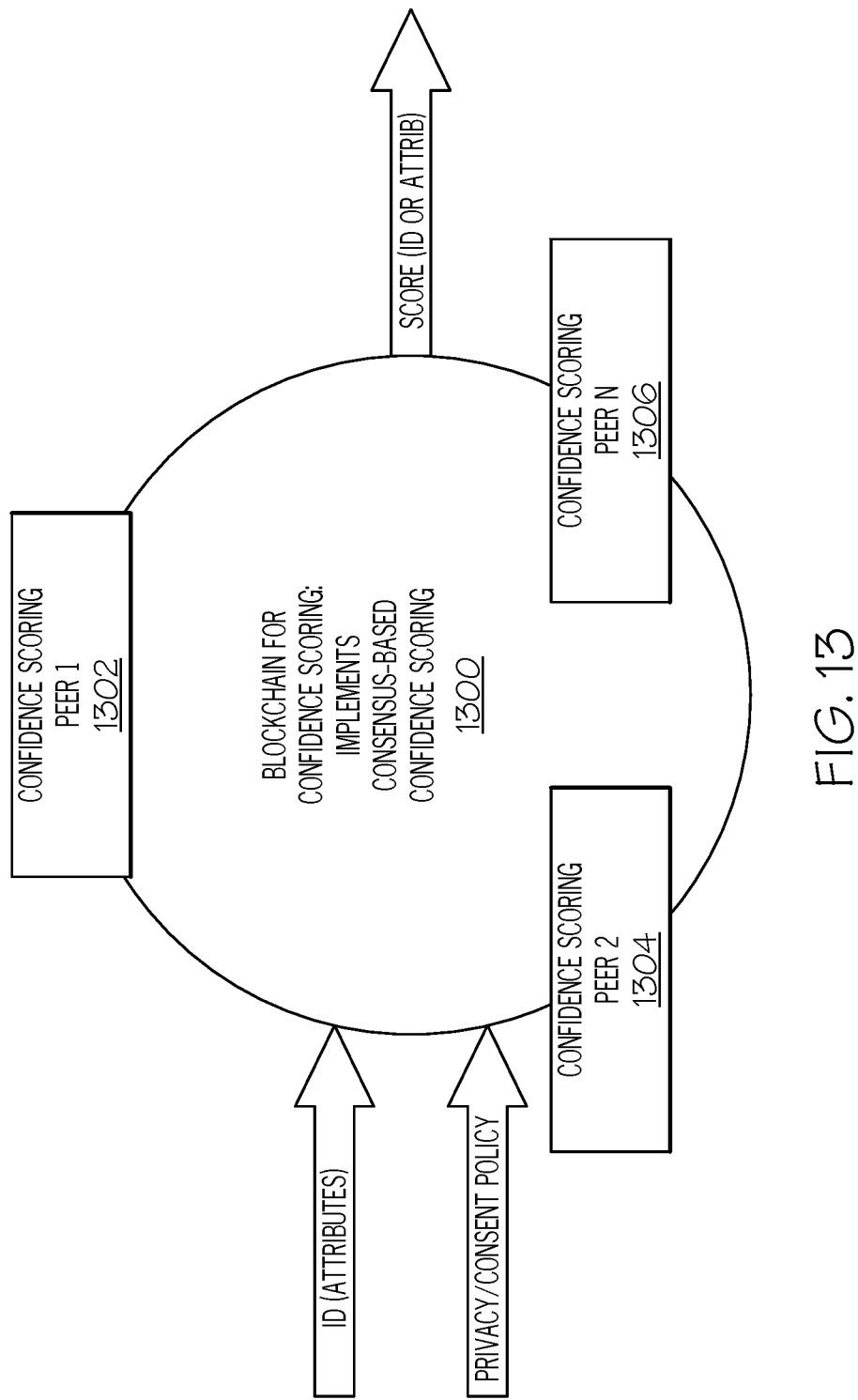
FIG. 13 depicts another high-level overview of a decentralized system (e.g., a blockchain) generates confidence scores for an identity in accordance with one or more embodiments of the present invention.

As depicted in another illustration in FIG. 13, the confidence scoring peers 1302-1306 (analogous to agents 1202-1206 shown in FIG. 12) in the blockchain 1300 (analogous to blockchain 1200 shown in FIG. 12) work together to generate a consolidated/consensus confidence score for the identity/attribute. If a consensus is not met, then that confidence score is not accepted by the system. That is, assume that confidence score for an identity/attribute is generated by confidence scoring peer 1 (1302), confidence scoring peer 2 (1304), and confidence scoring peer 3 (1306). If these three confidence scores are not the same, or at least within a predefined range of one another, then they are not trusted, and are not provided to identity consumers.

As just described in FIGS. 11-13, one or more embodiments of the present invention utilize a blockchain to generate a confidence level for attributes/identities. Exemplary blockchains are described now in FIGS. 14-16.

Figure 14:
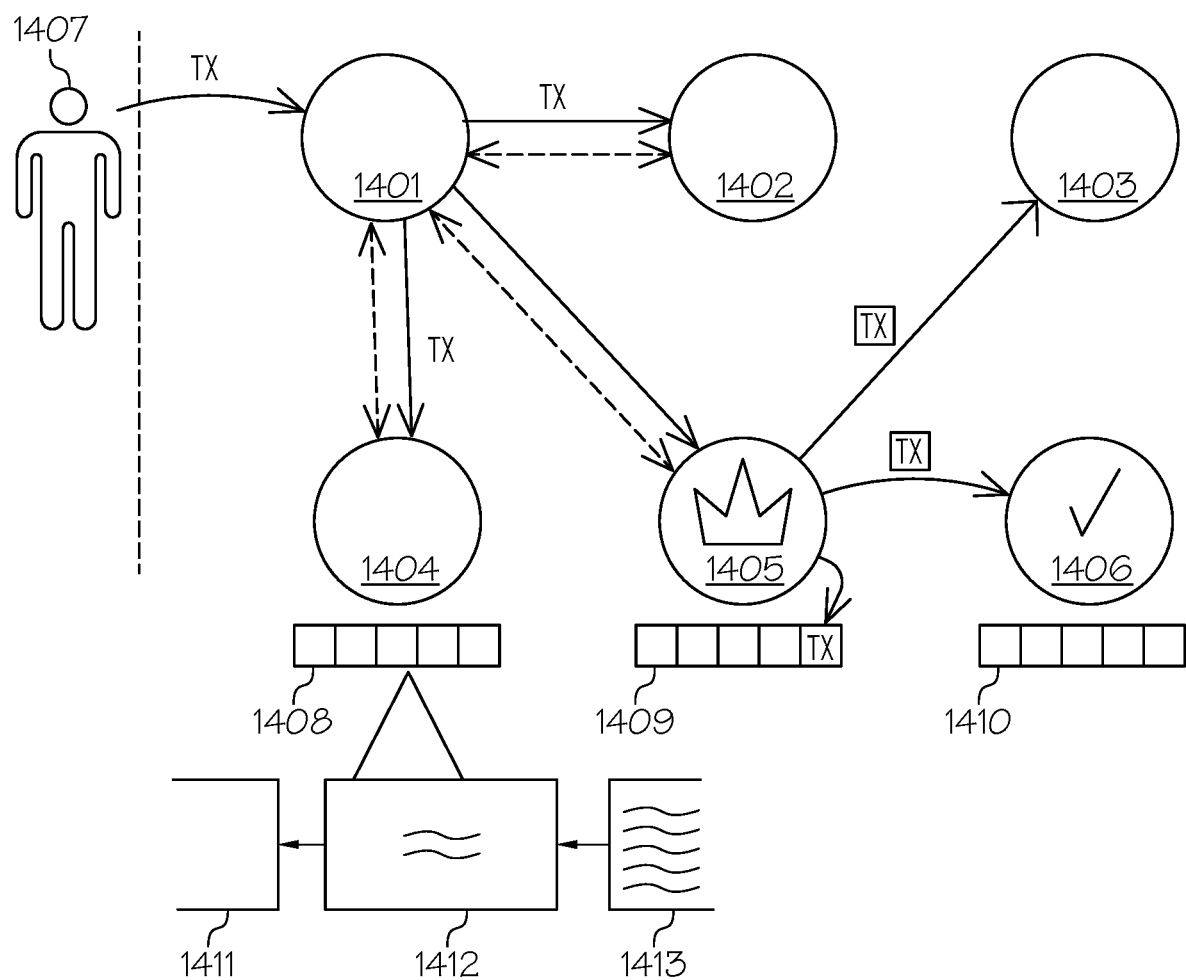
FIG. 14 depicts an exemplary blockchain architecture as used in one or more embodiments of the present invention.

With reference now to FIG. 14, an illustration of exemplary blockchains as used in one or more embodiments of the present invention is presented. As shown in FIG. 14, computers 1401, 1402, 1403, 1404, 1405, and 1406 represent an exemplary peer-to-peer network of devices used to support a peer blockchain (in which more or fewer computers/machines form the peer-to-peer network of devices). Each of the computers 1401, 1402, 1403, 1404, 1405 and 1406 (which in various embodiments are be telecommunication devices, portable computers, servers, etc.) in the peer-to-peer network has a same copy of data (e.g., data that represents transaction events), as held in ledgers stored within the depicted blockchains 1408, 1409, 1410 that are associated with respective computers 1404, 1405, 1406.

As shown in FIG. 14, a client 1407 (e.g., a computer) sends a transaction Tx (e.g., an event, such as a generation of an attribute for an identity, or a request for a generation of an attribute for an identity, that occurred with the client 1407) to the client's peer (depicted as computer 1401). Computer 1401 then sends the transaction Tx to ledgers known as the depicted blockchains 1408, 1409, 1410 that are associated with other peers, including the depicted computers 1402, 1404, 1405.

Blocks within exemplary blockchain 1008 are depicted as block 1411, block 1412, and block 1413. Block 1413 is depicted as a newest entry into a ledger held in blockchain 1408, and includes not only the newest transactions but also a hash of the data from the older block 1412, which includes a hash of the even older block 1411. Thus, older blocks are made even more secure each time a new block is created, due to the hashing operations.

As shown in FIG. 14, computer 1405 has been designated as a leader peer according to a consensus model of the peer-to-peer network. In order to be designated as the leader peer, computer 1405 has to be the first to confirm (or create) what the attribute in Tx is. That is, computer 1401 encrypted Tx is a copy of the attribute that has been encrypted using one-way encryption algorithm (e.g., Secure Hash Algorithm 2—"SHA-2"). Since this is a one-way encryption algorithm, there is no way to know what was used as the input by simply reverse-engineering the encryption. However, blockchain protocols require that the leading bits in the encrypted (hashed) data follow a certain pattern, such as eight leading zeros followed by other bits (e.g., "00000000xxxxxxxxxxxx"). Thus, computer 1405 simply used brute force to input many combinations of data into the SHA-2 algorithm until an output of "00000000xxxxxxxxxxxx" is achieved. Since the first eight bits were correct ("00000000"), then there is an assumption that the other bits ("xxxxxxxxxxxx") are also correct, since the odds of getting "00000000" correct but not getting "xxxxxxxxxxxx" are extremely small. Note that while computer 1405 is working on this problem (of guessing what the input data to the SHA-2 algorithm by computer 1401 is), other computers such as computers 1401-1404 and 1406 are also working on the problem.

Assume now that computer 1405 won the "race" to decrypt Tx before computers 1401-1404 and 1406. Thus, computer 1405 will send the data ("00000000xxxxxxxxxxxx") in a newly-encrypted form (using a key provided by computer 1401) to one or more of computers 1401-1404 and 1406. One or more of computers 1401-1404 and 1406 will then check computer 1405's work. For example, assume that Tx described a particular attribute/identity of a person having a bank account with Bank X. If a blockchain ledger contained within the blockchain fabric confirms (has a record of) that person having a bank account with Bank X, then one or more of the computers 1401-1404 and 1406 will assume that computer 1405 accurately decrypted Tx as being an attribute stating that the person has a bank account with Bank X (i.e., an attribute of the identity of that person is that this person has a bank account with Bank X). Once a predefined quantity of peer computers from computers 1401-1404 and 1406 agree that the decrypted value of Tx is correct, then computer 1405 will be designated as the leader peer for Tx, and will be compensated (e.g., in money) for its use of computing resources. That is, the nodes/computers that receive the new block/transaction (Tx) then attempt to validate the new block/transaction. If enough (i.e., some predefined quantity/percentage) of the nodes/computers validate the new block/transaction, then the new block/transaction is deemed valid for the entire peer-to-peer network of computers 1401-1406 and is added to the blockchains (including the depicted blockchains 1408, 1409, 1410) associated with all of the nodes/peers/computers 1401-1406. Thus, the confidence value for attribute that is confirmed by a consensus of the nodes/peers/computers 1401-1406 is deemed to be accurate, and the attribute/identity is provided to requesting consumers.

Figure 15:
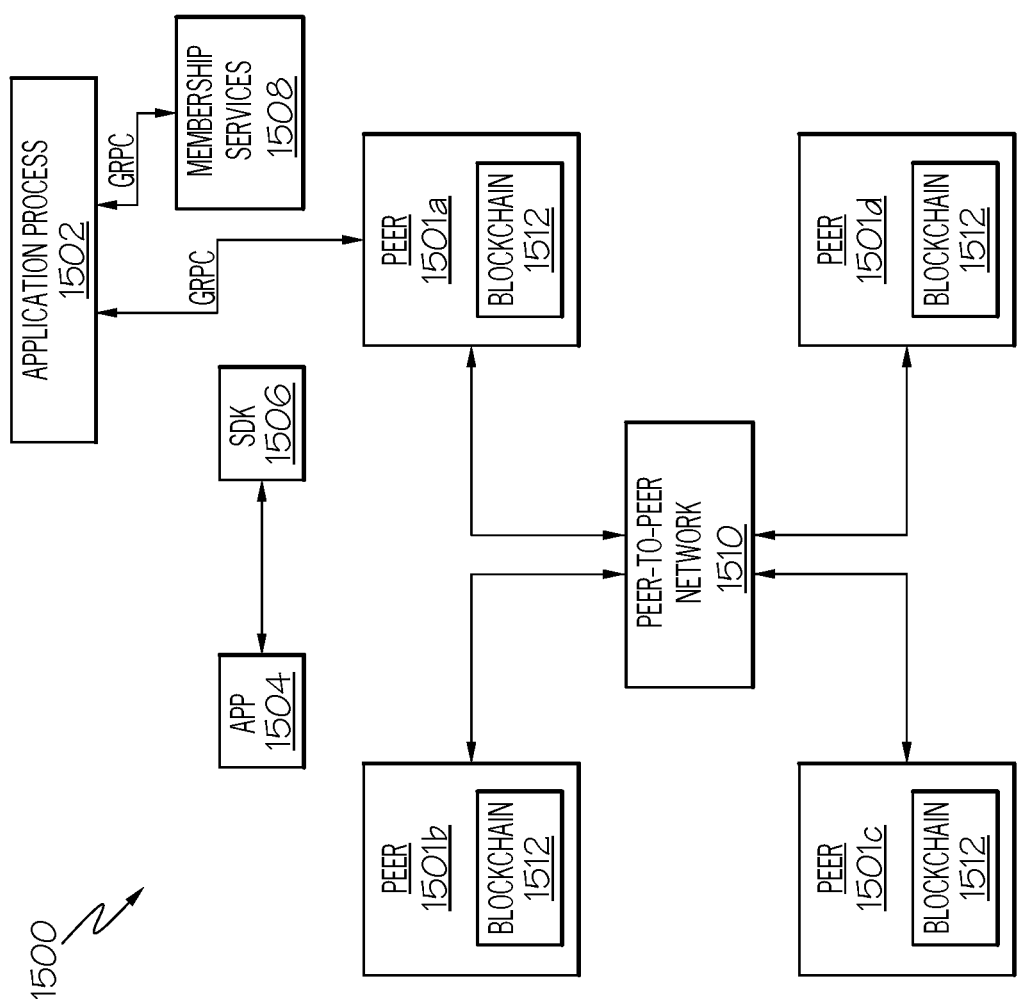
FIG. 15 illustrates additional detail of an exemplary blockchain topology as used in one or more embodiments of the present invention.
Figure 16:
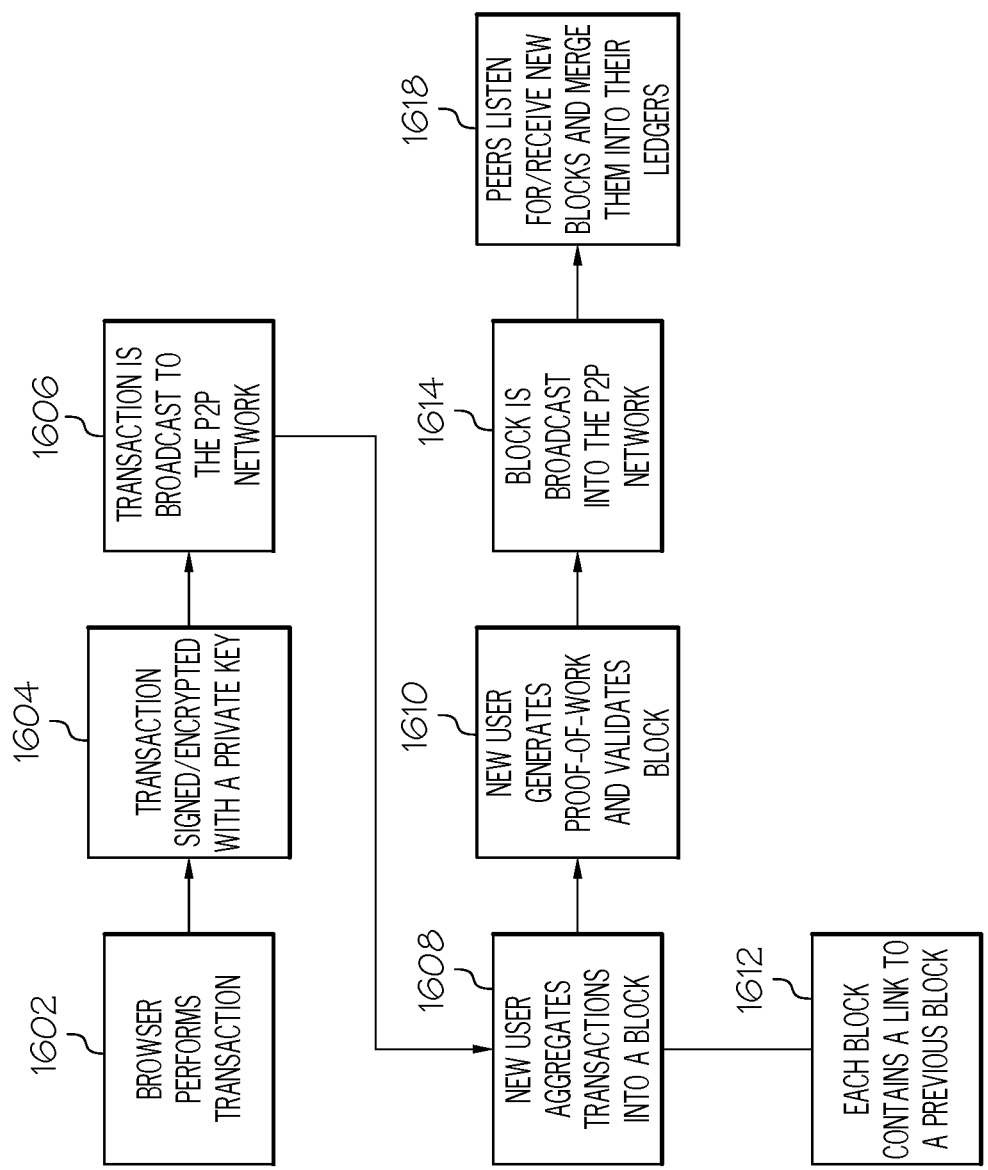
FIG. 16 depicts a high-level use of a blockchain in accordance with one or more embodiments of the present invention.

With reference now to FIGS. 15-16, additional detail of a blockchain and its operation as used by the present invention is presented.

In one or more embodiments of the present invention, a blockchain fabric, such as blockchain fabric 1500 depicted in FIG. 15, is used to provide the infrastructure (e.g. execution of the chaincodes) and services (e.g., Membership services such as Identity management) for securely and transparently storing, tracking and managing transactions on a "single point of truth". The blockchain fabric 1500 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain fabric 1500 (also known as the "blockchain system", "open blockchain" or "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

When a transaction is executed, its corresponding chaincode is executed by several validating peers of the system. For example, as shown in FIG. 15, peers 1501a501d (i.e., other computers, servers, etc.) establish the validity of the transaction parameters and, once they reach consensus, a new block is generated and appended onto the blockchain network. That is, an application process 1502 running on a client (e.g., client 1407 shown in FIG. 14) executes an application such as the depicted App 1504, causing a software development kit (SDK) 1506 to communicate using general remote procedure calls (grpc) to membership services 1508 that support the peer-to-peer network 1510 that supports the blockchain 1512 using the peers 1501a-1501d.

Exemplary operation of the open blockchain fabric 1500 shown in FIG. 15 is presented in FIG. 16. As described in step 1602, a browser (e.g., on client 1407 shown in FIG. 14) performs a transaction (e.g., creating a new feature on an identity asset). As shown in step 1604, the client signs and encrypts the transaction with a private key, such as SHA-2. This SHA-encrypted transaction is then broadcast to the peer-to-peer network 1510, as described in step 1606. A new user (e.g., peer 1501c) aggregates the transaction(s) into blockchain 1512, as shown in step 1608. As shown in block 1612, each block in the blockchain contains a link to a previous block in the blockchain. The newly-revised blockchain 1512 is validated by one or more of the other peers in peers 1501a-1501d (step 1610), and is then broadcast to the peers 1501a-1501b and peer 1501d, as described in step 1614. These peers 1501a-1501b and peer 1501d listen for and receive the new blocks and merge them into their copies of blockchain 1512 (step 1616).

Thus, the open blockchain fabric 1500 shown in FIG. 15 is a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

As such, a blockchain fabric uses a distributed network to maintain a digital ledger of events, thus providing excellent security for the digital ledger, since the blockchain stored in each peer is dependent upon earlier blocks, which provide encryption data for subsequent blocks in the blockchain.

That is, the open blockchain fabric 1500 provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., encrypted) based on one or more previous blocks.

Figure 17:
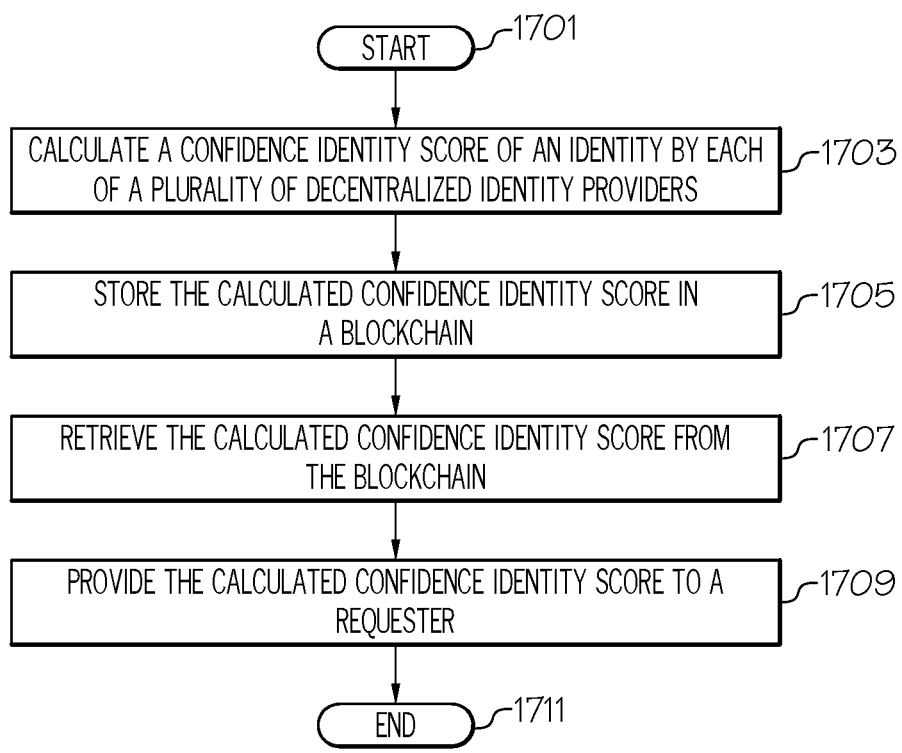
FIG. 17 illustrates a high-level overview of the present invention illustrates a high-level overview of a decentralized system (e.g., a blockchain) generates confidence scores for an identity in accordance with one or more embodiments of the present invention.

With reference now to FIG. 17, a high-level flow chart of one or more steps performed by one or more processors in accordance with one or more embodiments of the present invention is presented.

After initiator block 1701, one or more processors calculate an identity confidence score of an identity, as described in block 1703. As demonstrated herein (including FIGS. 11-6), this identity confidence score of the entity is calculated by each of a plurality of decentralized identity providers (e.g., within a blockchain).

As described in block 1705, the processor(s) store processors, the calculated identity confidence score in a blockchain.

As described in block 1707, the processor(s) retrieve the calculated identity confidence score from the blockchain.

As described in block 1709, the processor(s) provide the calculated identity confidence score to a requestor (e.g., a consumer of the identity). In one or more embodiments of the present invention, the requestor is a computer-based system (e.g., second computer 153 shown in FIG. 1) that performs an action based on the provided calculated identity score (e.g., as generated by the blockchain networked devices 151 shown in FIG. 1).

The flow chart shown in FIG. 17 ends at terminator block 1711.

In an embodiment of the present invention, the action that is performed by the requestor is providing a service that is provided by the requestor (e.g., a bank that is providing a bank loan or opening a checking account for a customer).

In an embodiment of the present invention, the action is providing data from a database that is provided by the requester. For example, in an embodiment of the present invention the consumer of the identity is a database supplier. Upon determining that the calculated identity score is at or above a predefined value (that indicates that the identity is to be trusted), then access to the database is allowed, and data is sent to the consumer of the identity.

In an embodiment of the present invention, the calculated identity confidence score is an aggregated calculated identity confidence score from the plurality of decentralized identity providers. (See the discussion above that is associated with FIGS. 11-16.)

In an embodiment of the present invention, the aggregated calculated identity confidence score is calculated at least in part using a knowledge graph containing a confidence score of each actor that uses the calculated identity confidence score. For example, consider the graphs shown in FIGS. 2-3. Each node in these figures is augmented with a confidence score for not only the identity and/or the attributes of the entity, but also for the actor that provided each attribute and/or identity. Thus, the more confidence that is assigned to an actor as being able to accurately provide a confidence score for one or more attributes in the entity, the higher the overall confidence score for the entire identity.

In an embodiment of the present invention, the aggregated calculated identity confidence score is calculated at least in part using a knowledge graph containing a confidence score of each actor that updates (rather than creating) the confidence score in the blockchain.

In an embodiment of the present invention, the aggregated calculated identity confidence score is calculated at least in part using a knowledge graph containing a confidence score of each actor that commits the confidence score to the blockchain. That is, each of the peers in the blockchain that stored/introduced/committed the confidence score to the blockchain shown in FIG. 10 is also depicted with a confidence score that this peer is accurately storing/introducing/committing the confidence score to the blockchain, as determined by a peer review by other peers in the blockchain. This leads to a determination as to how trustworthy that particular peer is in storing/introducing/committing the confidence score to the blockchain.

In an embodiment of the present invention, a machine learning system uses a recursive model for calculating the aggregated identity confidence scores, as described herein.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 18:
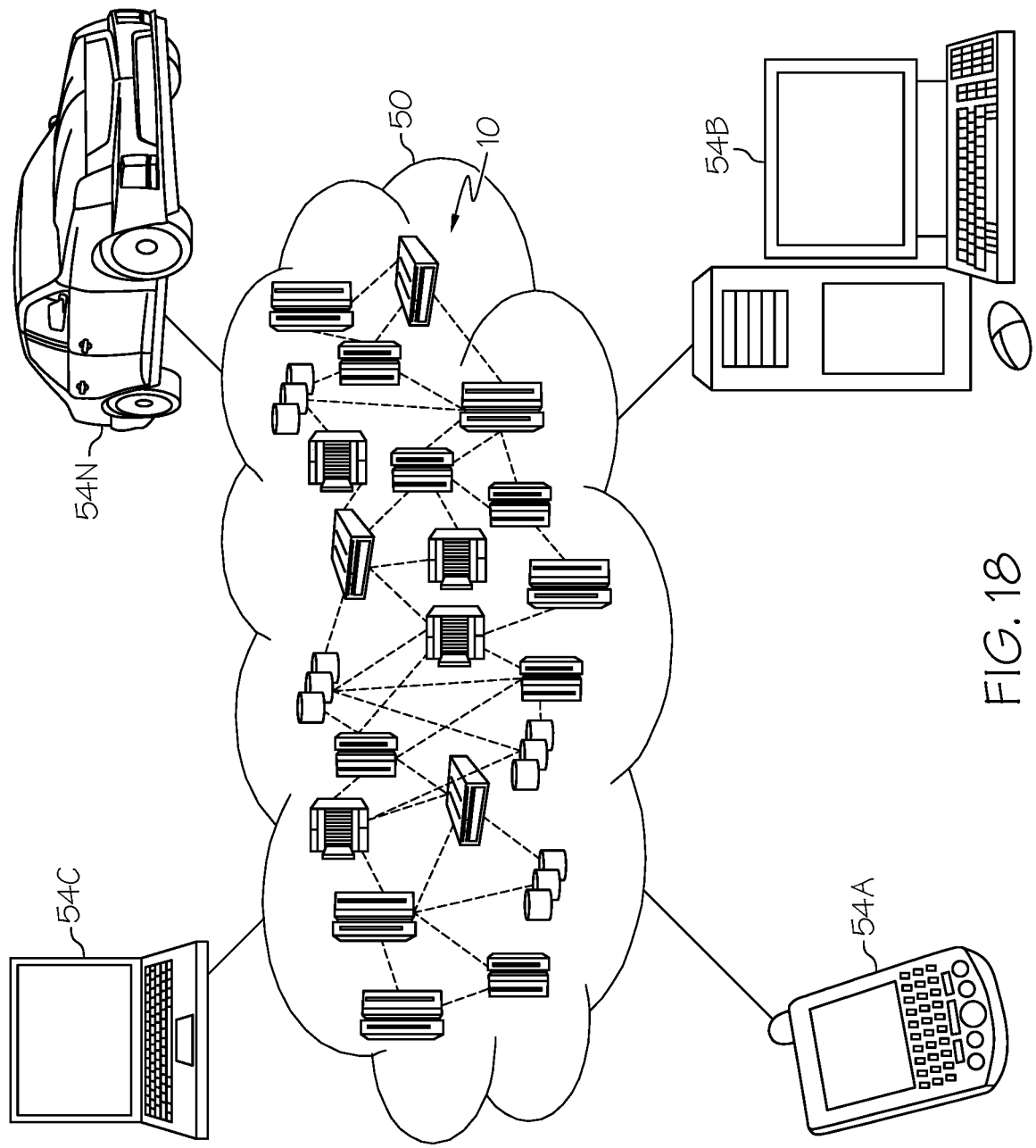
FIG. 18 depicts a cloud computing environment according to an embodiment of the present invention.

Referring now to FIG. 18, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 18 are intended to be illustrative only and that computing nodes 10 and cloud computing environment 50 can communicate with any type of computerized device over any type of network and/or network addressable connection (e.g., using a web browser).

Figure 19:
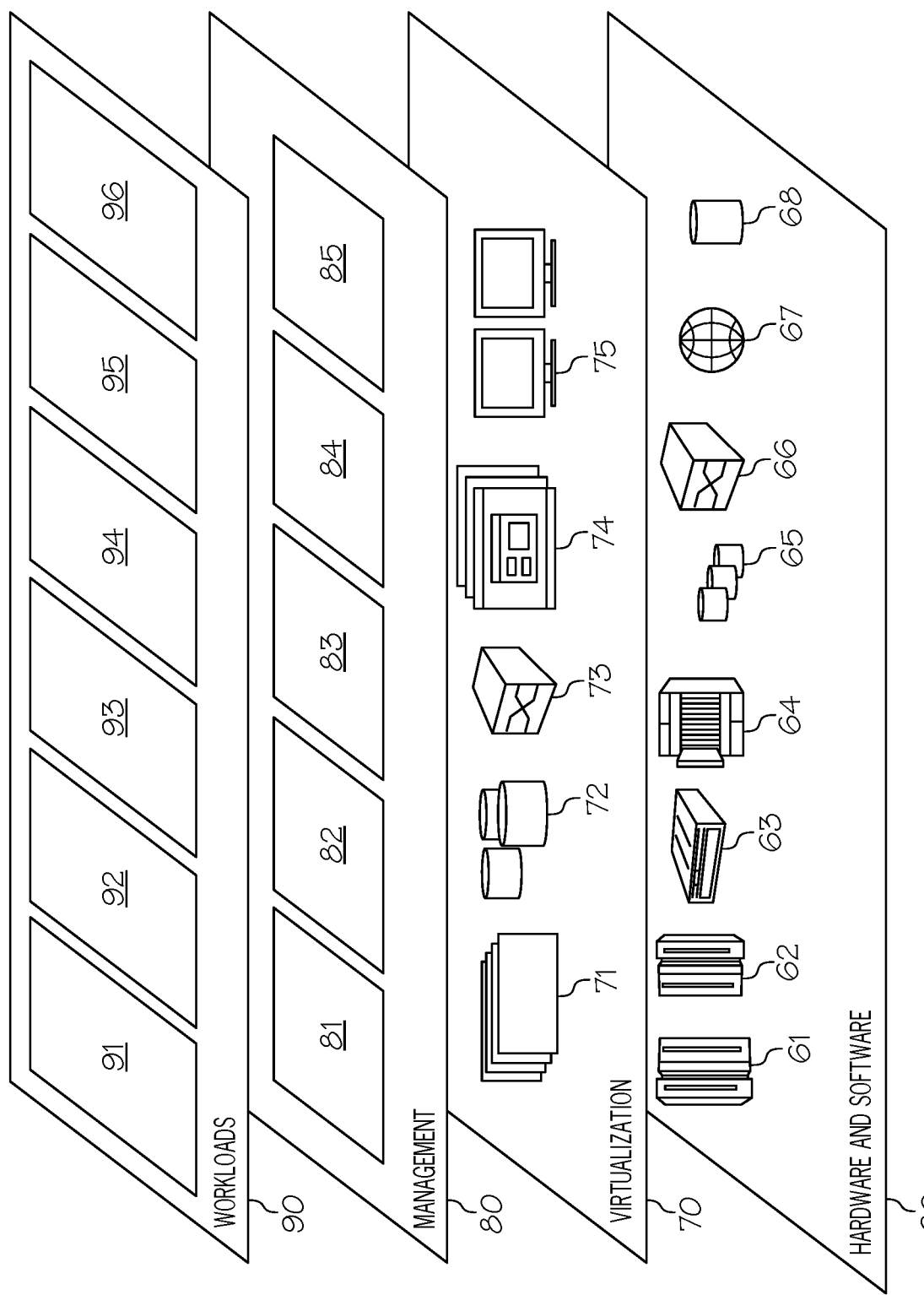
FIG. 19 depicts abstraction model layers of a cloud computer environment according to an embodiment of the present invention.

Referring now to FIG. 19, a set of functional abstraction layers provided by cloud computing environment 50 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and confidence score processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    calculating, by one or more processors, an identity confidence score of an identity of an entity by each of a plurality of decentralized identity providers;
    storing, by one or more processors, the calculated identity confidence score of the entity in a blockchain, wherein the calculated identity confidence score of the entity is an aggregated calculated identity confidence score from the plurality of decentralized identity providers, wherein the aggregated calculated identity confidence score of the entity is calculated at least in part using a knowledge graph, wherein the knowledge graph contains a confidence score for each actor that provides identity confidence scores to the blockchain, and wherein the confidence score of each actor describes how accurate the identity confidence scores provided by each actor to the blockchain are;
    retrieving, by one or more processors, the calculated identity confidence score of the entity from the blockchain; and
    providing, by one or more processors, the calculated identity confidence score of the entity to a requestor, wherein the requestor is a computer-based system that performs an action based on the provided calculated identity score.

2. The method of claim 1, wherein the action is providing a service that is provided by the requestor.

3. The method of claim 1, wherein the action is providing data from a database that is provided by the requester.

4. The method of claim 1, wherein the aggregated calculated identity confidence score of the entity is calculated at least in part using a knowledge graph containing a confidence score of each actor that updates the calculated identity confidence score in the blockchain.

5. The method of claim 1, wherein the aggregated calculated identity confidence score of the entity is further calculated at least in part using a knowledge graph containing a confidence score of each actor that commits the calculated identity confidence score to the blockchain.

6. The method of claim 1, wherein a machine learning system uses a recursive model for calculating the aggregated identity confidence scores.

7. A computer program product for calculating and utilizing a confidence score for decentralized identity scores from a blockchain, the computer program product comprising a non-transitory computer readable storage device having program instructions embodied therewith, the program instructions readable and executable by a computer to perform a method comprising:
- calculating an identity confidence score of an identity of an entity by each of a plurality of decentralized identity providers;
- storing the calculated identity confidence score of the identity of the entity in a blockchain wherein the calculated identity confidence score is an aggregated calculated identity confidence score from the plurality of decentralized identity providers, and wherein the aggregated calculated identity confidence score is calculated at least in part using a knowledge graph containing a confidence score of each actor to accurately commit the calculated identity confidence score to the blockchain as determined by other peers in the blockchain;
- retrieving the calculated identity confidence score from the blockchain; and
- providing the calculated identity confidence score to a requestor, wherein the requestor is a computer-based system that performs an action based on the provided calculated identity score.

8. The computer program product of claim 7, wherein the action is providing a service that is provided by the requestor.

9. The computer program product of claim 7, wherein the action is providing data from a database that is provided by the requester.

10. The computer program product of claim 7, wherein the aggregated calculated identity confidence score is further calculated at least in part using a knowledge graph containing a confidence score of each actor that uses the calculated identity confidence score.

11. The computer program product of claim 7, wherein the aggregated calculated identity confidence score is further calculated at least in part using a knowledge graph containing a confidence score of each actor that updates the confidence score in the blockchain.

12. The computer program product of claim 7, wherein a machine learning system uses a recursive model for calculating the aggregated identity confidence scores.

13. The computer program product of claim 7, wherein the program instructions are provided as a service in a cloud environment.

14. A computer system comprising one or more processors, one or more computer readable memories, one or more computer readable storage mediums, and program instructions stored on at least one of the one or more computer readable storage mediums for execution by at least one of the one or more processors via at least one of the one or more computer readable memories to perform a method comprising:
- calculating an identity confidence score of an identity by each of a plurality of decentralized identity providers;
- storing the calculated identity confidence score in a blockchain;
- retrieving the calculated identity confidence score from the blockchain; and
- providing the calculated identity confidence score to a requestor, wherein the requestor is a computer-based system that performs an action based on the provided calculated identity score wherein the calculated identity confidence score is an aggregated calculated identity confidence score from the plurality of decentralized identity providers, wherein the aggregated calculated identity confidence score is calculated using a knowledge graph containing a first confidence score of each actor that uses the calculated identity confidence score, wherein the aggregated calculated identity confidence score is further calculated using the knowledge graph containing a second confidence score of each actor that updates the confidence score in the blockchain, and wherein the aggregated calculated identity confidence score is further calculated using the knowledge graph containing a third confidence score of each actor that commits the confidence score to the blockchain.

15. The computer system of claim 14, wherein the program instructions are provided as a service in a cloud environment.

* * * * *